(12) United States Patent
Jakobsen (10) Patent No.: US 9,980,496 B2
(45) Date of Patent: May 29, 2018

(54) TRIMMING SYSTEM FOR TRIMMING FISH (71) Applicant: MAREL SALMON A/S, Støvring (DK)

(72) Inventor: Bjarne Kjeld Jakobsen, Nibe (DK)

(73) Assignee: MAREL SALMON A/S, Støvring (DK)

(*) Notice: Subject to any disclaimer, the term of this patent is extended or adjusted under 35 U.S.C. 154(b) by 0 days. days.

(21) Appl. No.: 15/550,185

(22) PCT Filed: Feb. 10, 2016

(86) PCT No.: PCT/EP2016/052801
§ 371 (c)(1),
(2) Date: Aug. 10, 2017

(87) PCT Pub. No.: WO2016/128449
PCT Pub. Date: Aug. 18, 2016

(65) Prior Publication Data
US 2018/0027828 A1 Feb. 1, 2018

(30) Foreign Application Priority Data
Feb. 10, 2015 (EP) .................................... 15154483

(51) Int. Cl.
*A22C 25/16* (2006.01)
*A22C 25/08* (2006.01)
A22C 25/14 (2006.01)

(52) U.S. Cl.
CPC .............. *A22C 25/16* (2013.01); *A22C 25/08* (2013.01); *A22C 25/142* (2013.01); *A22C 25/145* (2013.01)

(58) Field of Classification Search
CPC ......... A22C 25/00; A22C 25/08; A22C 25/14; A22C 25/16; A22C 25/163; A22C 25/166; A22C 25/18; A22B 3/08

USPC .................. 452/149–157, 160–163, 165, 170
See application file for complete search history.

(56) References Cited

U.S. PATENT DOCUMENTS

| 4,084,294 A * | 4/1978 | Dohrendorf ........... A22C 25/08 452/135 |
| 4,748,723 A * | 6/1988 | Braeger ............... A22C 25/166 452/122 |
| 6,200,211 B1 | 3/2001 | Braeger et al. |
| 6,280,313 B1 * | 8/2001 | Braeger ................. A22C 25/16 452/161 |

(Continued)

FOREIGN PATENT DOCUMENTS

| GB | 2089642 A | 6/1982 |
| WO | 2012062331 A1 | 5/2012 |

OTHER PUBLICATIONS

European Search Report from EP Application No. EP15154483, Jul. 21, 2015.

(Continued)

*Primary Examiner* — Richard T Price, Jr.
(74) *Attorney, Agent, or Firm* — Workman Nydegger (57) ABSTRACT

A trimming system for fish which is placed with belly sides on opposite sides of a supporting structure. A force supplying means applies opposite forces onto the belly sides towards the supporting structure. A profile measuring means determines the profile of the belly sides, and a cutting means trims the belly sides. Opposite forces are supplied by the force supplying means while the belly sides are measured by the profile measuring means, and the opposite forces are supplied while the belly sides are simultaneously trimmed.

21 Claims, 7 Drawing Sheets

(56) References Cited

U.S. PATENT DOCUMENTS

| | | | | |
|---|---|---|---|---|
| 6,322,437 | B1* | 11/2001 | Grabau ................ | A22C 25/16 |
| | | | | 452/135 |
| 7,090,574 | B2* | 8/2006 | Braeger ................ | A22C 25/16 |
| | | | | 452/161 |
| 8,118,647 | B2* | 2/2012 | Mikajiri ................ | A22C 25/14 |
| | | | | 452/149 |
| 8,814,637 | B2* | 8/2014 | Jurs ....................... | A22C 25/16 |
| | | | | 452/162 |

OTHER PUBLICATIONS

International Search Report from PCT Application No. PCT/EP2016/052801, May 24, 2016.

\* cited by examiner

TRIMMING SYSTEM FOR TRIMMING FISH

FIELD OF THE INVENTION

The present invention relates to a trimming system and a method for trimming fish.

BACKGROUND OF THE INVENTION

WO2012062331 discloses a fish filleting machine comprising a number of stations for continuous filleting of fish, where de-capitated and gutted fish is placed right side up, i.e. the back of the fish upwards and front end foremost in an in-feed channel. The fish filleting machine comprises six stations, where a first station comprises means for engaging the fish and centring the fish relative to a vertical plane of the machine, such that lower sides of the fish are arranged on opposite sides of the plane. A second station comprises means for detecting and registering the vertical extent of the lower edges of the fish and the back of the fish. A third station comprises means for fixating the back of the fish, and cutting means for cutting slits in the back of the fish, the slits having an extent at least along either side of the protruding back fin. A fourth station comprising articulated cutting means, where the articulated cutting means are arranged on either side of the vertical plane, suitable for cutting/trimming at least a part of the lowermost sides and/or edges of the fish. A fifth station where upper cutting means are positioned along the vertical plane for cutting the fish meat free from the vertebrae of the fish. A sixth station comprises means for cutting vertically on either side of the vertebrae and a seventh station for directing the bone-free fillets to further processing.

The second station mentioned above detects the geometrical size of the sides of the fish by means of registering the vertical extent of the lower edges of the fish relative to the back, and this data is used as input data in trimming the belly part at the fourth station. However, the measuring arrangement for measuring the geometrical size of the sides of the fish and the configuration of the fourth station can result in inaccuracy in the geometrical measurement and thus in inaccurate in trimming the belly part of the fish.

SUMMARY OF THE INVENTION

On the above background it is an object of embodiments of the present invention to provide a fully automated and accurate solution for trimming belly sides of fish.

Embodiments of the invention preferably seek to mitigate, alleviate, or eliminate one or more of the above mentioned disadvantages singly or in any combination.

In particular, it may be seen as an object of embodiments of the present invention to provide a trimming system that solves the above mentioned problems, or other problems, of the prior art.

To address one or more of these concerns, in a first aspect of the invention a trimming system is provided for trimming fish such as de-capitated and gutted fish, e.g. salmon, the system comprising:

a supporting structure adapted to engage with the fish such that a first belly side of the fish extends along a first side of the supporting structure and a second belly side of the fish extends along a second side of the supporting structure, a force supplying means for supplying opposite forces onto the first and the second belly sides towards the first and the second sides of the supporting structure, an advancing means for advancing the fish from a first position to a second position, a profile measuring means arranged at the first position for measuring, at the first and the second sides of the supporting structure, the profile of the first and the second belly sides of the fish, a cutting means arranged at the second position, the cutting means being operable to trim the first and second belly sides of the fish, a control unit operably connected to the profile measuring means for receiving profile data acquired by the profile measuring means and for controlling operation of the cutting means to trim the first and second belly sides of the fish, wherein the profile measuring means and the force supplying means are positioned and configured such that the opposite forces are supplied by the force supplying means at the first position while a lower edge of at least one of the first and the second belly sides is being measured by the profile measuring means.

Additionally, the cutting means and the force supplying means may be positioned and configured such that the opposite forces are supplied by the force supplying means, e.g. at the second position, while at least one of the first and second belly sides of the fish is being trimmed by the cutting means.

The advancing means advances the fish between the first and second positions thereby moving the fish in a conveying direction. The term "first position" refers to a zone between two first virtual planes perpendicular to the conveying direction, i.e. one plane on opposite sides of the place where the measurement of the profile takes place. The term "second position" refers to a zone around the cutting means and the force supplying means, particularly where the force supplying means ends and the cutting means starts.

In order to enable control of the cutting means on the basis of the profile data acquired by the measurement means, the cutting means may comprise controlled motors, such as servo motors, controlled by a computer unit which receives data from measurement means.

Even though one belly side could be trimmed based on measurements of the profile of either that same side, or even based on measurement of the other belly side, the trimming may become more exact, if the at least one of the first and second belly sides are trimmed based on measurements on both belly sides. As an example, one or both belly sides may be trimmed based on an average between the measurements on both sides.

Measuring of the lower edge of the at least one of the first and second belly sides is carried out at the same time as the opposite forces are being applied. Thus, during operation of the system, the steps of applying the forces and measuring are performed simultaneously such that the measurement takes place while the fish is pressed against the supporting structure. Likewise, trimming of the lower edge of the at least one of the first and second belly sides of a fish is carried out at the same time as the opposite forces are applied to the first and second belly sides of the fish. Thus, during operation of the system, the steps of applying the forces to a fish and the step of trimming that fish are performed simultaneously.

Accordingly, by pressing the first and the second belly sides towards the first and the second sides of the supporting structure, while the profile measurement takes place, it is ensured that a highly accurate profile measurement is obtained of the first and the second belly sides.

Also, by pressing the first and the second belly sides towards the first and the second sides of the supporting structure while the trimming takes place ensures that the position of the first and the second belly sides is kept fixed during the trimming, which makes the trimming more reliable and accurate.

To further increase the accuracy, the force supplying means may be located at the second position, i.e. close to the cutting means and at least sufficiently close to enable pressing a fish and cutting of the same fish, simultaneously. Accordingly, the distance between the force supplying means and the cutting means is preferably less than half a normal expected minimum length for a salmon or similar fish, i.e. preferably less than 10 cm, such as preferably less than 5 cm. or even less than 3 cm.

Particularly, the pressing of the first and the second belly sides towards the first and the second sides of the supporting structure may be continued while the fish is moved from the first to the second position. Accordingly, the force supplying means may be adapted to continuously supply the opposite forces between the first and the second positions. This prevents changing of the position of the first and the second belly sides during the movement from the first to the second position, which again enhances the yield of the trimming process.

Particularly, the pressing of the first and the second belly sides towards the first and the second sides of the supporting structure while the fish is moved from the first to the second station may be a continuous pressing by an essentially constant pressing force. During trimming the cutting means is advantageously controlled by a control unit on the basis of the profile data acquired by the profile measuring means. In particular, the position and/or orientation of the cutting means relative to the fish may be controlled and varied throughout the trimming action and hence adapted to the profile of each individual fish.

In one embodiment, the force supplying means extends between the first and the second positions. This may particularly adapt the force supplying means to continuously apply the opposite forces between the first and the second positions. Since the applied pressure is at no time released as the fish is advanced between the first and the second positions, the accuracy of the trimming is even further enhanced, not least since possible changes in the position of the fish belly sides between the first and the second positions are reduced or eliminated.

In one embodiment, the force supplying means comprises a spring load system arranged at the first position and at the second position, where the spring load system comprises a plurality of spaced apart beams arranged down the side of the supporting structure, where each of the spaced apart beams includes a first end facing the supporting structure and a second end connected to a spring load so as to allow the first end of the spaced apart beams to follow the thickness of the first and the second belly sides. Herein, the term "second end" does not necessarily constitute the termination of the spaced apart beams but that point along the spaced apart beam where the spring acts on the beam, e.g. centrally between two axially opposite terminations of the beam.

In one embodiment, the force supplying means further comprises a plurality of elongated beams extending at least between the first and the second positions along the first and the second sides of the supporting structure, where each elongated beam is mounted to one or two of the spaced apart beams such that the plurality of elongated beams interact with the fish under influence of force from the springs.

It is thus ensured that the first and the second belly sides will not be damaged while the force supplying means presses the first and the second belly sides towards the first and the second sides of the supporting structure. The spring load system may comprise any type of spring and is preferably rigidly mounted to a support structure positioned distally away from the first end to provide the support needed for the spring load system.

At least one and preferably each of the of elongated beams may comprise a force providing structure configured to provide force against the supporting structure very close to the end of the elongated beam and particularly very close to the cutting means, i.e. downstream the elongated beams when seen in the conveying direction. The force providing structure could be arranged at least at one of the first (107) and the second (108) positions, and particularly at the second position to thereby press the fish against the supporting structure just before it is trimmed.

The force providing structure could e.g. be in the form of a flexible end portion, e.g. an end portion made of a flexible material, e.g. a rubber or synthetic material. Due to the flexibility, the end portion becomes elastically deformable to thereby provide additional pressure towards the supporting structure.

The flexible end portion may particularly have a higher elastically deformability in a direction towards or away from the supporting structure than in other directions. Herein, the term "elastically deformable" means that the flexible end portion is more easily deformed elastically than the remaining part of the elongated beam. The flexible end portion could be a separate piece attached to the remaining part of the elongated beam or the elongated beam including the flexible end portion may be formed in one piece.

In one embodiment, the supporting structure comprises a flat plate structure, and it may particularly comprise two parallel plate structures, e.g. flat plate structures. The two plate structures are placed with a distance to each other to thereby allow space for the bone and/or tail of the fish when it is conveyed from the first to the second position.

The profile measuring means may comprise at least a first pivotal member arranged at the first side of the supporting structure and optionally a second pivotal member arranged at the second side of the supporting structure. Each of the pivotal members may comprise a free end arranged to interact with the exposed ends of the belly sides of the fish. One way of interacting with the fish involves displacement of the pivotal member by direct contact with the fish when the fish is conveyed in the conveying direction from the first position to the second position.

To determine the profile of the fish, the angular position of the first and/or the second pivotal members is determined by an angle measuring structure, e.g. a sensor coupled to a computer.

In one embodiment, the profile measuring means comprises both a first pivotal member arranged at the first side of the supporting structure, and a second pivotal member arranged at the second side of the supporting structure, where each of the first and the second pivotal members are pivotally mounted to a structure such that each pivotal member becomes rotatable around a rotation axis with a free end of each of the first and the second pivotal members facing the fish and adapted to interact with the fish such that the belly sides of the fish moves the pivotal members and thus changes the angular position of pivotal members relative to the supporting structure as the fish moves along the pivotal member. The angular position of the first and the second pivotal members is utilized to determine the profile of the first and the second belly sides.

Although the mechanical solution as described above with reference to this embodiment has a number of advantages, e.g. is robust and reliable in difficult processing conditions such as wet environment, other profile measuring means may just as well be utilized, such as lasers or vision based means, for measuring the profile of at least one of the first and the second belly sides.

The angular position of the pivotal member corresponds to a specific height. The ratio of an angle to a height of the fish may be determined e.g. by calibrating the device and by storing the calibration data in memory of the system. The calibration data may e.g. include a mathematical expression of the fish height as a function of the angular position of the pivotal member, or it may be a table with values of the angular position and corresponding heights of the fish.

The determination of the profile may, as an example, be based on sampling of date. Accordingly, a specific angle, which corresponds to a specific height of the fish may be included in a data set with other angles, and in combination, the angles may be used for calculating a profile of the first and/or the second belly sides.

In one embodiment, the cutting means comprises a circular cutting blade. Other cutting means may just as well be utilized, such as high pressurized water jet, cutting blade, laser, and the like.

The trimming system is in one embodiment typically positioned such that the fish, e.g. a salmon, is centered on the supporting structure, e.g. the aforementioned couple-plate structure. The supporting structure is preferably vertically arranged, such that the back of the fish is facing upwards and the first and the second belly sides extend down and along the first and the second sides of the supporting structure.

The term trimming may, according to the present invention, be understood as the process of removing the fat at the edges of the first and the second belly sides. If the supporting structure is vertical, then trimming may particularly mean that fat is removed from the lower edges of the first and the second belly sides.

The orientation of the fish is preferably such that the head part comes first, i.e. head part pointing forward, and tail part pointing backwards relative to the conveying direction. As mentioned already, the fish may be de-capitated prior to the entrance into the trimming system.

The force supplying means, e.g. in the form of the elongated beams, may preferably extend to a point which is very close to the cutting means.

If the cutting means comprises a circular blade, the force supplying means and the circular cutting blade may both be closer than the diameter of the circular cutting blade from a virtual plane which is transverse to a conveying direction from the first to the second position, or even closer than half of the diameter, or one fourth of the diameter of the circular cutting blade.

In one embodiment, the force supplying means may even meet in the transverse plane, or they may both intersect and thus overlap the transverse plane.

The trimming system may comprise a sole with a slot in which a rotating circular blade of the cutting means is received. During use, the fish enters the space between the sole and circular blade, and the sole thereby prevents the fish from being deflected away from the circular blade.

The circular blade and the sole are connected to an actuator such that they move as one combined element in response to the measured profile of the first or the second belly sides. Particularly, the actuator may be configured for vertical, up-down movement and rotation of the blade and sole. Alternatively, if there is no sole, the actuator may be configured to move just the blade.

To ensure positioning of the fish in the space between the sole and the circular blade, the elongated beams, or at least the flexible end portion thereof may preferably extend to a position very close to the sole, e.g. closer than the diameter of the blade or even closer than half of the diameter, or closer than one fourth of the diameter of the circular cutting blade.

The trimming system may further comprise filleting means arranged to cut fillets from the belly sides of the fish. Such filleting means may particularly include one or two belt saws arranged for cutting vertically on either side of the vertebrae. Since trimming may effectively be carried out while the first and second belly sides are still joined, the cutting means which is used for trimming may preferably be arranged between the filleting means and the profile measuring means such that the fillets are made after the trimming.

The trimming system may further comprise back cutting means for cutting an incision into the back of the fish to thereby facilitate the subsequent filleting process. Since the trimming is more effectively done before the incision creation, the back cutting means may be arranged between the cutting means and the filleting means whereby the profile measuring and the trimming is performed before the back incision is made.

The trimming system may further comprise a tail cutting means arranged for cutting from anal vent to tail of the fish.

In a second aspect of the invention, a method is provided for trimming fish, the method comprising:
  engaging the fish with a supporting structure such that a first belly side of the fish extends along a first side of the supporting structure and a second belly side of the fish extends along a second side of the supporting structure,
  supplying opposite forces onto the first and the second belly sides towards the first and the second sides of the supporting structure with a force supplying means,
  advancing the fish from a first position to a second position with an advancing means,
  measuring, at least at one of the first and the second sides of the supporting structure, the profile of at least one of the first and the second belly sides with a profile measuring means arranged at the first position,
  utilizing profile data from the profile measuring means for operating a cutting means arranged at the second position for trimming the belly sides of the fish,
  wherein the opposite forces are supplied at the first position while measuring the lower edges of at least one of the first and the second belly sides and where the opposite forces are supplied while trimming the fish.

Accordingly, a highly efficient and accurate method is provided for trimming the first and the second belly sides of the fish such as salmon.

In one embodiment, the method according to the second aspect of the invention is initiated by de-capitating and/or gutting the fish.

In one embodiment, the method is carried out with the front end of the head pointing forward in the conveying direction.

In general, the various aspects of the invention may be combined and coupled in any way possible within the scope of the invention. These and other aspects, features and/or advantages of the invention will be apparent from, and elucidated, with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
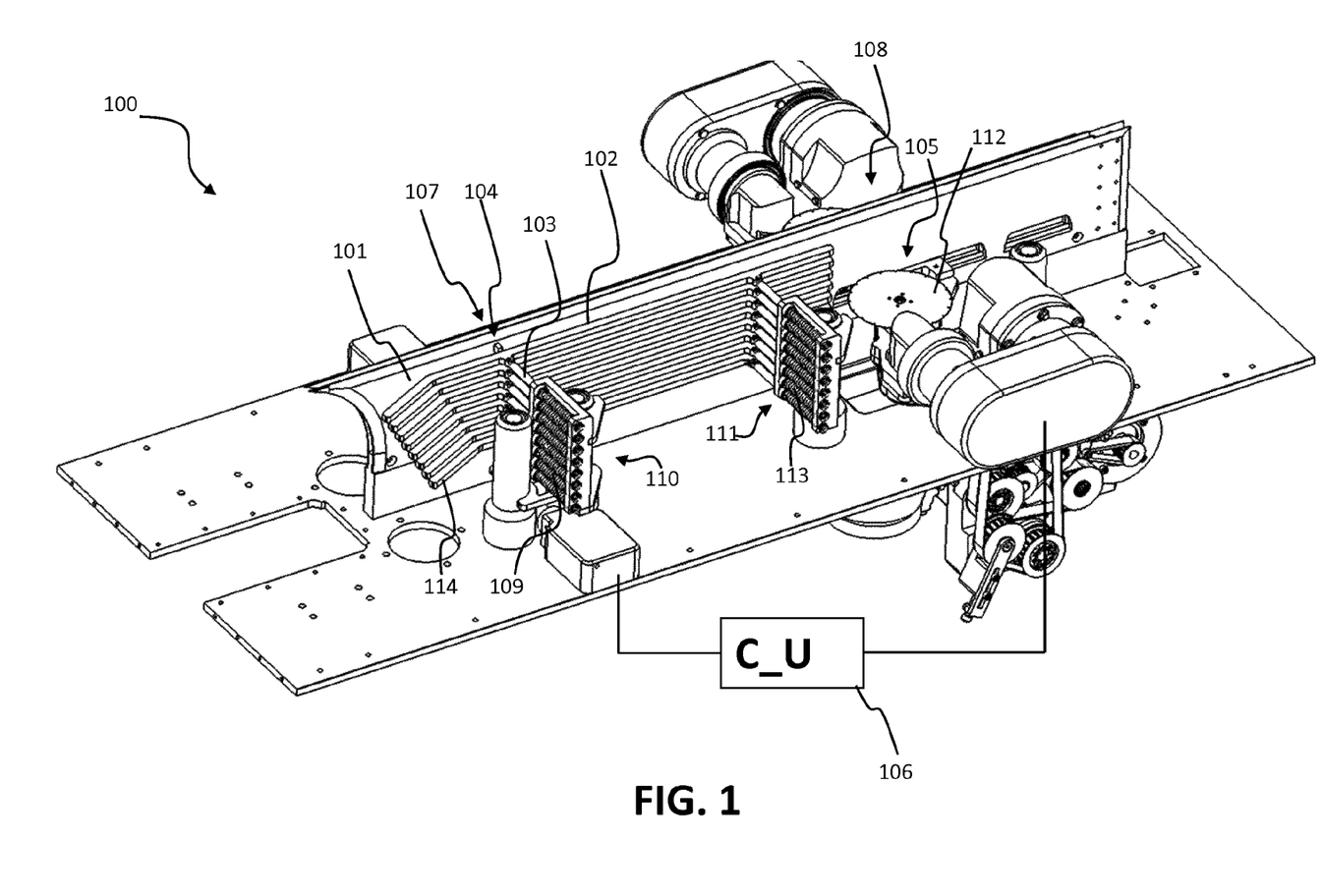
FIG. 1 illustrates an embodiment of the invention in the form of a trimming system for trimming de-capitated and gutted fish.

FIG. 1 depicts one embodiment of a trimming system 100 according to the present invention for trimming de-capitated and gutted fish, the system comprising a supporting structure 101, a force supplying means 110, 111, an advancing means (not shown), a profile measuring means 104, a cutting means 105, and a control unit 106.

The supporting structure 101 is adapted to engage with the fish such that a first belly side (not shown) of the fish extends along a first side of the supporting structure 101 and a second belly side (not shown) of the fish extends along a second side of the supporting structure.

The force supplying means 110, 111 is adapted to supply opposite forces onto the first and the second belly sides towards the first and the second sides of the supporting structure 101 and the advancing means is adapted to advance the fish from a first position 107 to a second position 108.

The profile measuring means 104 is arranged at the first position 107 for measuring, at the first and the second sides of the supporting structure, the profile of the first and the second belly sides of the fish and the cutting means 105, which may comprise a circular cutting blade 112, is arranged at the second position 108 and is operable to trim the first and second belly sides of the fish.

The control unit 106 is operably connected to the profile measuring means 104 for receiving profile data acquired by the profile measuring means 104 and for controlling operation of the cutting means 105 so as to trim the first and second belly sides of the fish. If the fish is a salmon, trimming involves cutting the fat at the edges of the first and the second belly sides away.

As depicted here, the profile measuring means 104, the cutting means 105, and the force supplying means 110, 111 are positioned and configured such that the opposite forces supplied by the force supplying means 102 at the first position are applied while lower edges of the first and the second belly sides are being measured by the profile measuring means 104, and also while at least one of the first and second belly sides of the fish is being trimmed by the cutting means 105.

In the embodiment shown here, the force supplying means 110, 111 comprises a spring load system 109, 113 arranged at the first position 107 and at the second position 108, respectively, where the spring load system comprises plurality of spaced apart beams 103 arranged down the side of the supporting structure 101, where each of the spaced apart beams includes a first end facing the supporting structure and a second end connected to a spring load 109, 113 so as to allow the first end of the spaced apart beams to follow the thickness of the first and the second belly sides without damaging the fish.

The force supplying means 110, 111 shown here further comprises a plurality of elongated beams 102 extending at least between the first 107 and the second 108 positions along the first and the second sides of the supporting structure 101. Each elongated beam is mounted to a first end of one of the plurality of spaced apart beams such that the plurality of elongated beams interact with the fish by influence of the pressure applied by the spaced apart beams. Accordingly, with this arrangement, the force supplying means supplies, via the elongated beams 102, force onto the belly sides of the fish at all times while the fish is being advanced from the first position 107 to the second position 108.

The first position forms a receiving end of the trimming system 100 where the distal end parts 114 of elongated beams 102 are partly bend away from the supporting structure 101 so as to facilitate the process of receiving the fish into the trimming system.

The drawing primarily shows details on one side of the supporting structure. On the other side of the supporting structure (not shown), the same features and functions are typically applied.

Figure 2:
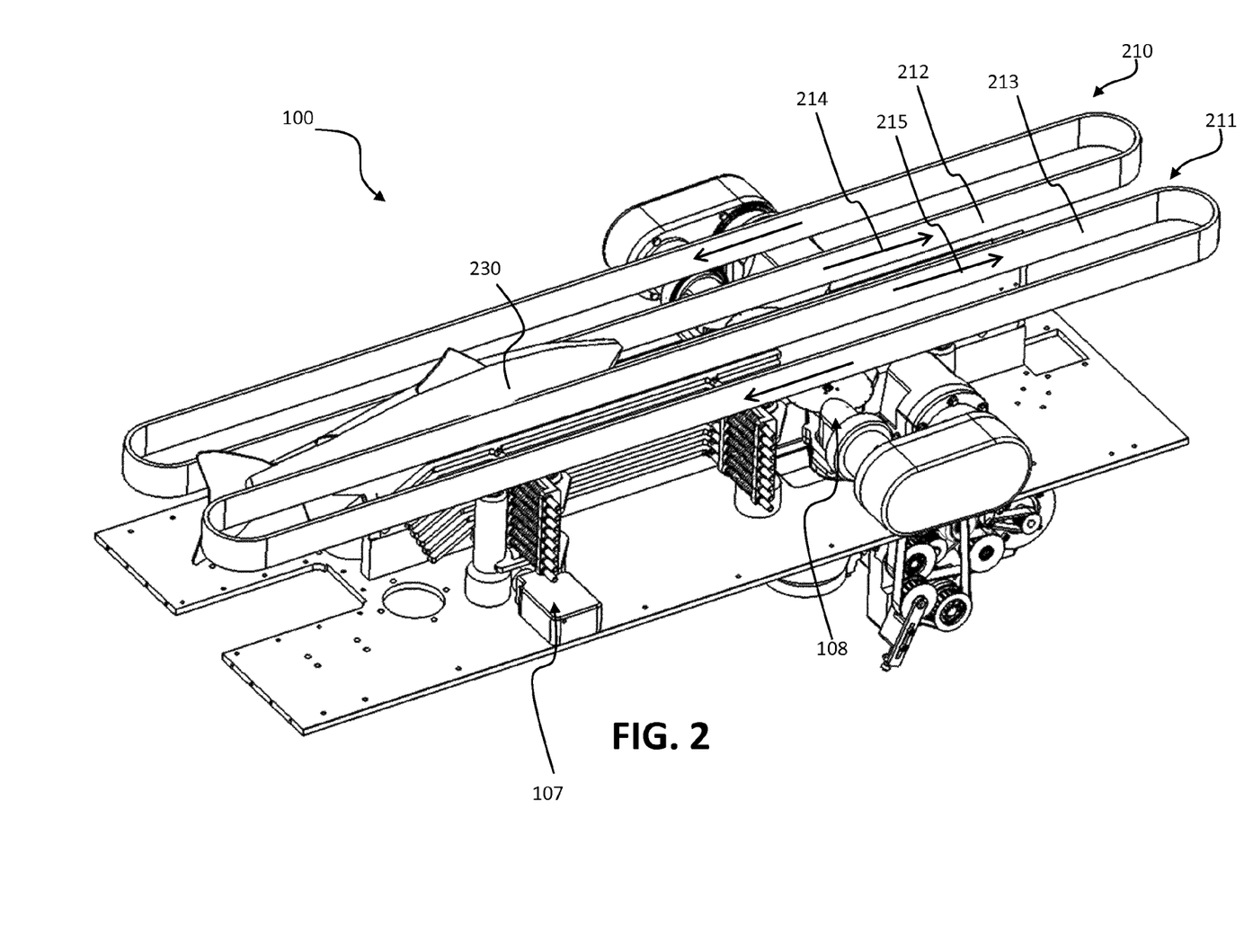
FIG. 2 depicts the embodiment in FIG. 1 further comprising a advancing means, FIGS. 3a and b show an enlarged view of FIG. 1, FIGS. 4, 5 illustrate a perspective view of an embodiment of the system with and without a fish.

FIG. 2 shows the trimming system 100 in FIG. 1 further comprising one embodiment of the advancing means, where the advancing means shown here comprises two side-by-side arranged closed loop belts 210, 211 driven by at least one driving unit (not shown) having a conveying direction such that adjacent sides 212, 213 of the closed loop belts move in the same direction as indicated by arrows 214, 215. Moreover, the internal positioning of the closed loop belts 210, 211 is such that the adjacent sides 212, 213 of the belts 210, 211 engage with the fish 230 and convey it from the first position 107 to the second position 108. The internal position of the closed loop belts 210, 211 may be such that the fish 230 is clamped between the adjacent sides 214, 215 during the conveying and/or the sides of the closed loop belts 210, 211 may be provided with means that interact with the fish during the conveying, e.g. small pins/needles and the like, or the closed loop belts 210, 211 may be made of material having high friction coefficient so as to ensure that the sufficient contact force is present during the conveying.

As shown here, it is preferred that the orientation of the fish is such that the head side comes first and as mentioned previously, the fish may be de-capitated and gutted prior to the conveying of the fish through the system.

Figure 3A:
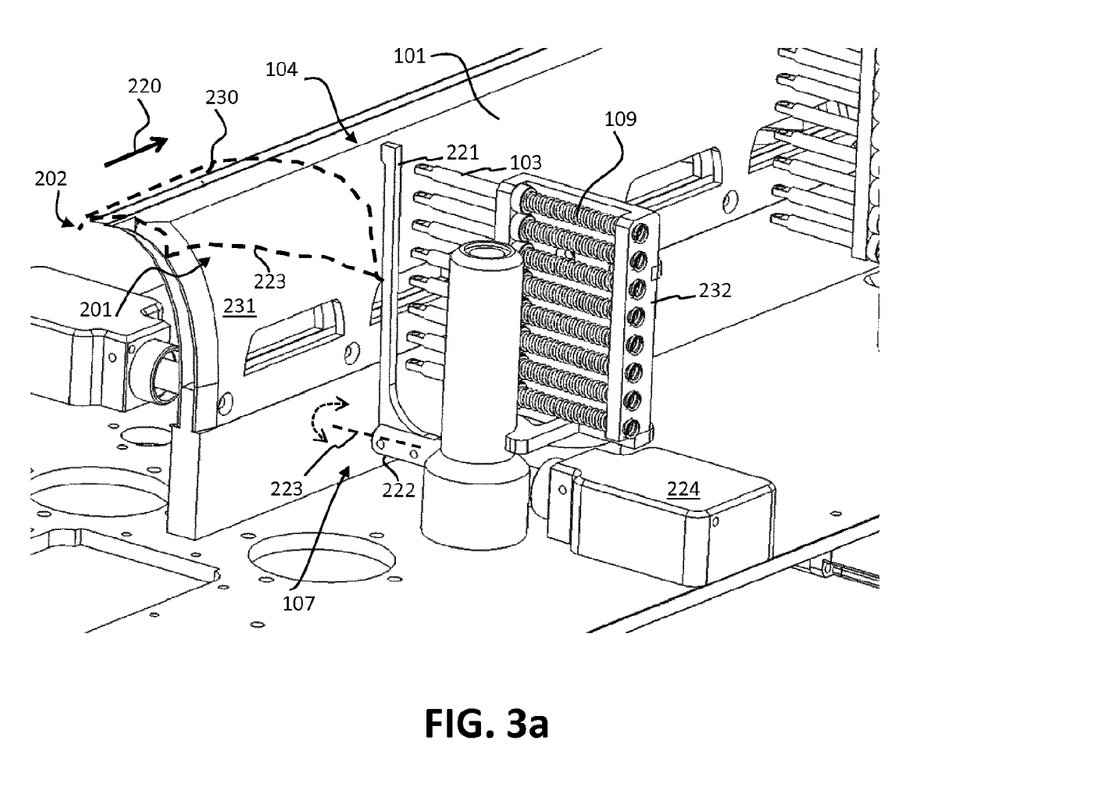
Figure 3B:
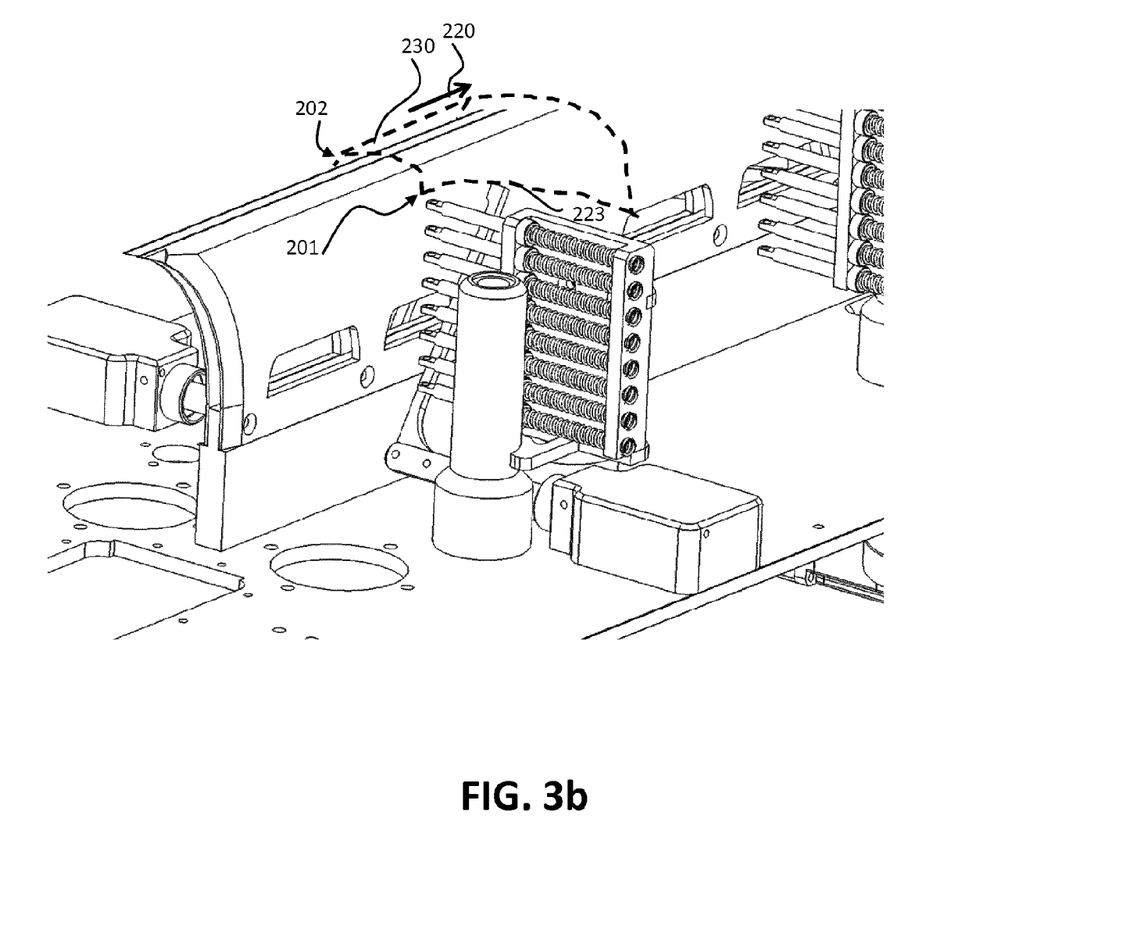

FIGS. 3a and b show an enlarged view of the system shown in FIG. 1. The force supplying means are omitted for showing in further details, the profile measuring means 104.

FIG. 3a shows an incoming fish 230 conveyed in a conveying direction as indicated by arrow 220 approaching the first position 107 where a first belly side 201 of the fish extends along a first side 231 of the supporting structure 101 and a second belly side 202 of the fish 230 extends along a second side of the supporting structure 101, and FIG. 3b shows the fish at a later point in time, e.g. fraction of a second, or one or more seconds. The fish is being advanced towards the second position.

The profile measuring means 104 in this embodiment comprises a first pivotal member 221 arranged at the first side 231 of the supporting structure 101 and a second pivotal member (not shown) arranged at the same position but at the second side of the supporting structure 101. Each of the first 221 and the second pivotal members are pivotally mounted to a structure 222 which is rotatable around a rotation axis 223 that is substantially perpendicular to the conveying direction of the fish 220. The free end of each of the first and the second pivotal members is adapted to interact with the exposed ends 223 of the belly sides of the fish 201. The angular position of the first and the second pivotal members is utilized by a receiving device or a computing device 224 to determine the profile of the first and the second belly sides.

FIG. 3b shows where the first pivotal member 221 interacts with the fish causing an angular adjustment of the first pivotal member 221 to change.

Accordingly, the data captured due to the angular positions of the pivotal members are received as input data and used for determining the profile of the first and the second belly sides of the fish. This may, as an example, be done by calibrating the different angular positions of the pivotal members to the actual height of the fish and based thereon, operating the cutting means.

FIGS. 3a and b show in further details, the spring load system arranged at the first position (and partly the spring load system at the second position). The spring load system comprises the plurality of spaced apart beams 103 arranged down the side of the supporting structure, where the spring load 109 is preferably rigidly mounted to a rigid support structure 232.

FIGS. 4-8 illustrate a specific embodiment of the invention in which each elongated beam 102 forms a flexible end portion 301 at the second position 108. The flexible end portion is elastically deformable in a direction towards the supporting structure 101. The direction of the flexibility is illustrated by the arrow 302. The supporting structure 101 of this embodiment comprises two plates arranged parallel to each other.

Figure 4:
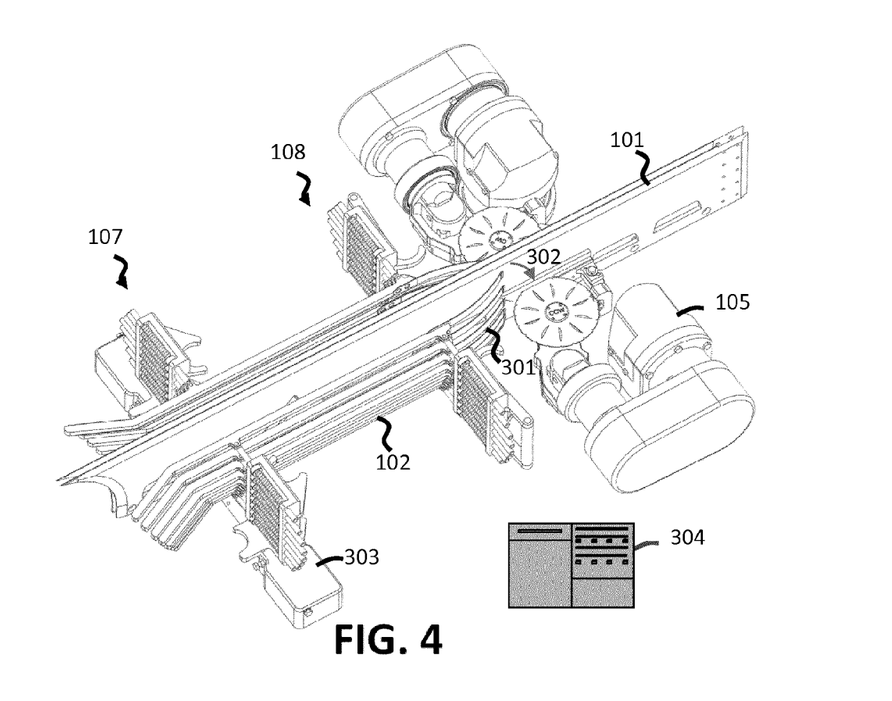

The sensor 303, e.g. a mechanical sensor with a pivoting member or an electronic sensor based on vision, laser or similar technologies, communicates with the computer unit 304 and controls the cutting unit 105 which thereby trims the fish based on its profile.

Figure 5:
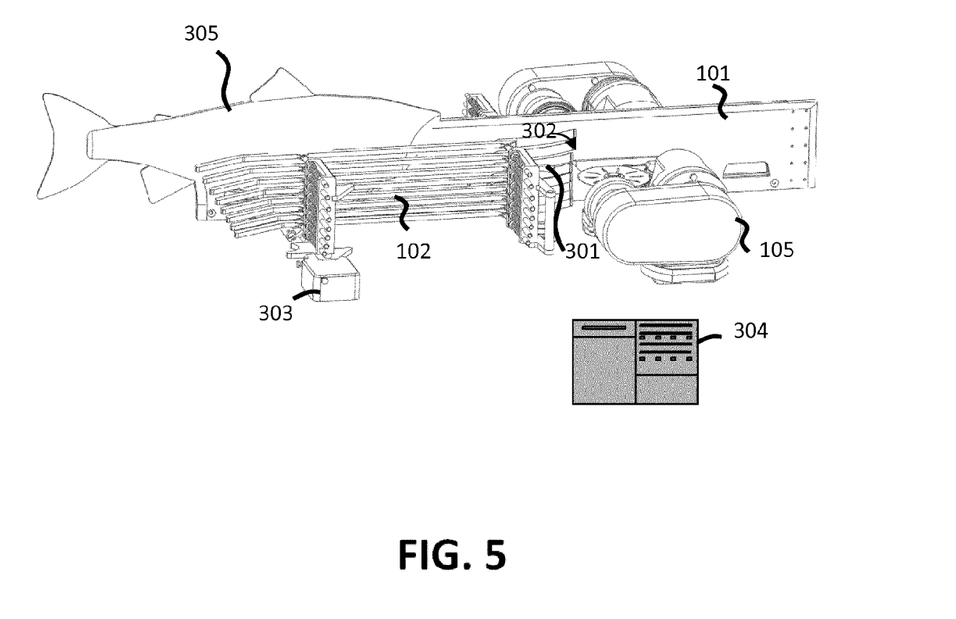

In FIG. 5, a fish 305 is conveyed from the first position 107 to the second position 108. At the second position, the fish will deflect the flexible end portions 301 outwardly, away from the support structure 101, and the elongated beams 102 thereby provides a pressure onto the fish in the direction towards the support structure 101 at a position very close to the cutting means 105. It is an advantage if the distance from the end portion 301 to the cutting means 105 in the conveying direction of the fish, is less the diameter or even less than half the diameter of the cutting means. This may effectively prevent undesired movement of the fish during trimming and particularly at the point where the cutting means engages the fish for carrying out the trimming process.

The flexible end portions 301 could be removably attached to the elongated beams 102, or they may be formed in one part with the remaining portion of the elongated beams.

Figure 6:
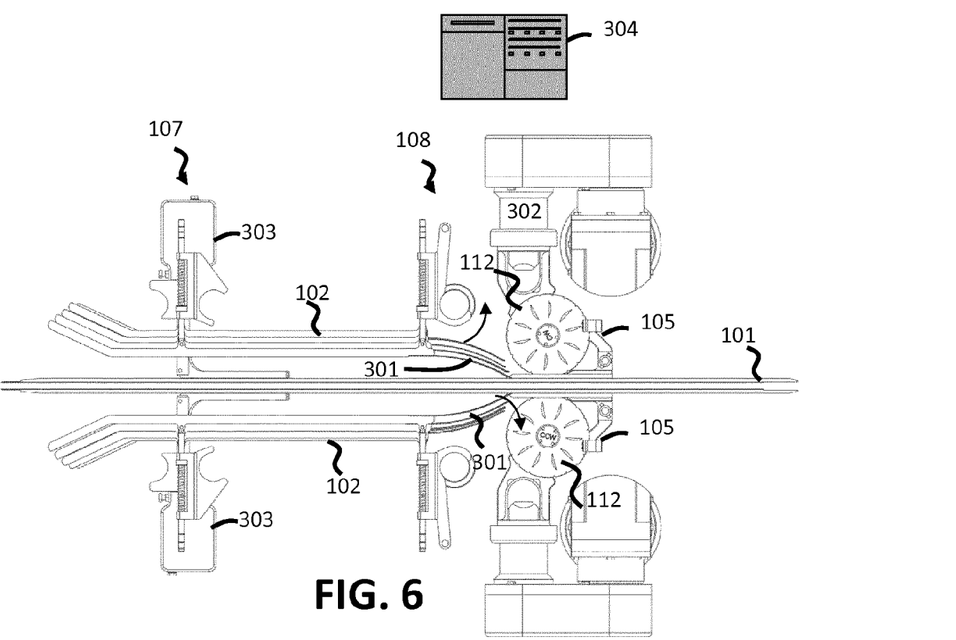
FIG. 6 illustrates a top view of the system shown in FIG. 4.

FIG. 6 illustrates a top view of the system, and it is clearly illustrated that the cutting means 105 is very close to the flexible end portion 301. In this embodiment, the cutting means comprises a circular cutting blade 112, and the flexible end portion overlaps the circular blade in the direction of conveying. In that way, the fish is prevented from escaping the blade.

Figure 7:
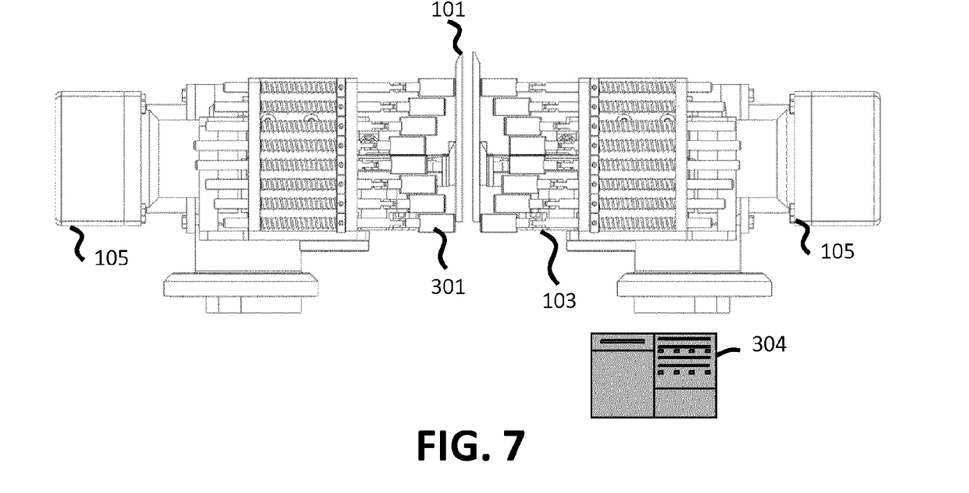
FIG. 7 illustrates a side view of the system shown in FIG. 4.

FIG. 7 illustrates an end view of the system. In this view, the spring load system with the plurality of spaced apart beams 103 is shown in a configuration as if a fish was conveyed between the two force supplying means 110, 111 but without illustrating the fish. FIG. 7 clearly illustrates how each of the spaced apart beams operates individually to thereby apply a uniform pressure onto the belly sides of the fish.

Figure 8:
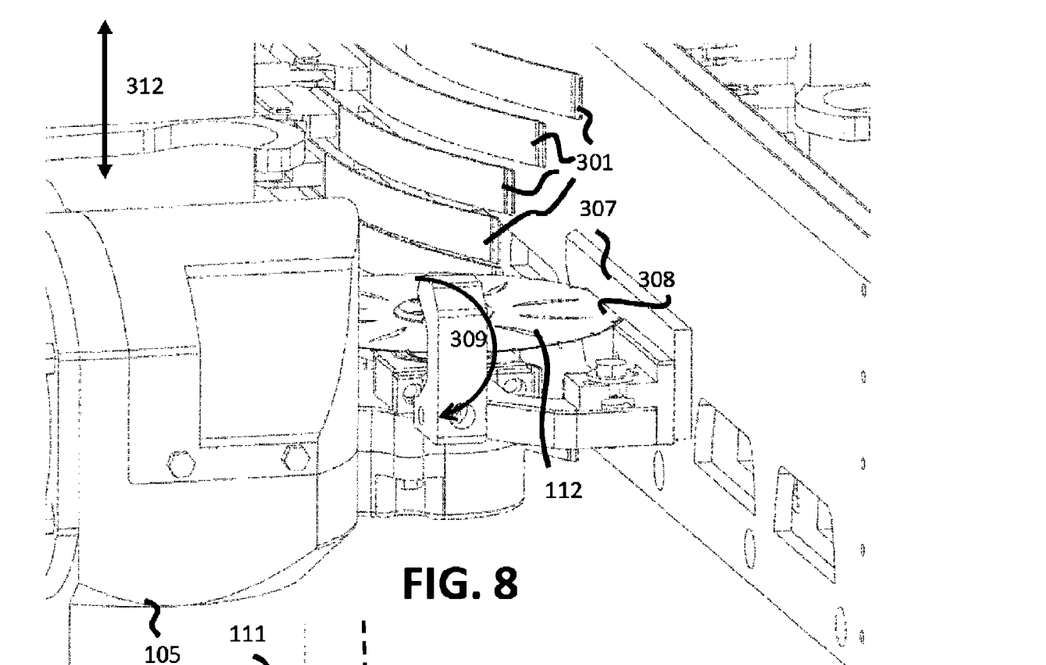
FIG. 8 illustrates an enlarged view of the cutting means arranged at the second position.

FIG. 8 illustrates a perspective view of the cutting means 105 in an embodiment where the cutting means comprises a sole 307 with a slot 308 in which the circular, rotating, blade 112 is received. During use, the fish is conveyed in the conveying direction and pressed against the supporting structure 101 by the force supplying means 110, 111.

When the fish reaches the cutting means, the sole prevents the fish from being displaced away from the knife.

Due to the flexible end portions 301, the fish is maintained fixed until just before reaching the circular blade. When the fish leaves the flexible end portions, it is almost in the gap between the circular blade and the sole 307 and it will therefore inevitably be cut by the blade with no chance of escaping.

The knife 112 and the sole 307 moves as one combined unit in response to the profile data from the profile measuring means. The actuator moving the blade and sole may be configured also for vertical, up-down movement and/or for rotation of the blade and sole. This is indicated by the arrows 309, 312.

Figure 9:
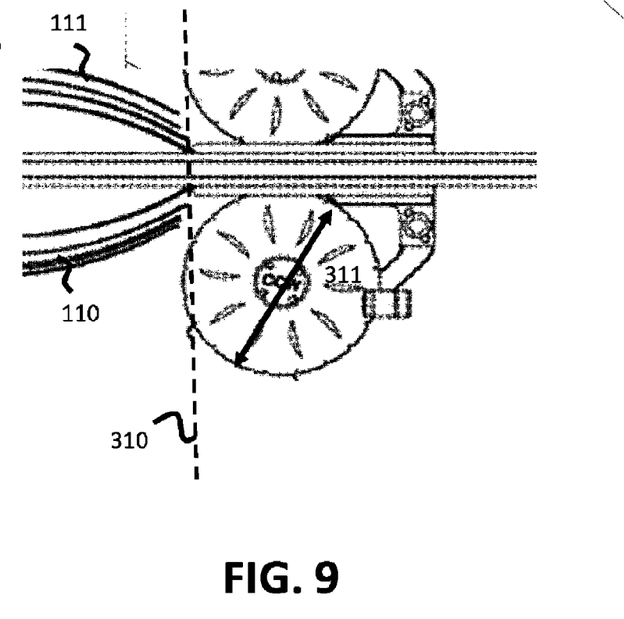
FIG. 9 illustrates a short distance between the force supplying means and the cutting means at the second position.

When the distance between the force supplying means and the cutting means is short, a better trimming can be obtained. FIG. 9 illustrates that the force supplying means 110, 111 and the circular cutting blade 112 are very close to each other. In fact, they both meet a virtual plane 310, or they may even intersect that plane. The plane 310 is a virtual plane which is transverse to the conveying direction from the first to the second position.

Larger distances may be considered, but it is generally preferred if the distance is shorter than the diameter of the blade indicated by the arrow 311.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

NUMBERED EMBODIMENTS

Embodiment 1

A trimming system (100) for trimming de-capitated and gutted fish (230), the system comprising:
  a supporting structure (101) adapted to engage with the fish such that a first belly side (201) of the fish extends along a first side of the supporting structure and a second belly side (202) of the fish extends along a second side of the supporting structure (101), a force supplying means (110, 111) for supplying opposite forces onto the first and the second belly sides (201, 202) towards the first and the second sides of the supporting structure (101), an advancing means (210, 211) for advancing the fish from a first position (107) to a second position (108), a profile measuring means (104) arranged at the first position for measuring, at the first and the second sides of the supporting structure, the profile of the first and the second belly sides of the fish, a cutting means (105) arranged at the second position, the cutting means (105) being operable to trim the first and second belly sides (201, 202) of the fish, a control unit (106) operably connected to the profile measuring means (104) for receiving profile data acquired by the profile measuring means (104) and for controlling operation of the cutting means (105) to trim the first and second belly sides (201, 202) of the fish, wherein the profile measurement means (104), the cutting means (105) and the force supplying means (110, 111) are positioned and configured such that the opposite forces are supplied by the force supplying means at the first position while a lower edge of at least one of the first and the second belly sides is being measured by the profile measurement means (104), and such that the opposite forces are supplied by the force supplying means at the second position while at least one of the first and second belly sides (201, 202) of the fish is being trimmed by the cutting means (105).

Embodiment 2

The trimming system according to embodiment 1, wherein the force supplying means (110, 111) extends between the first and the second positions and is further adapted to continuously supply the opposite forces between the first and the second positions.

Embodiment 3

The trimming system according to embodiments 1 or 2, wherein the force supplying means (110, 111) comprises a spring load system arranged at the first position and the second position, where the spring load system comprises plurality of spaced apart beams (103) arranged down the side of the supporting structure (101), where each of the spaced apart beams includes a first end facing the supporting structure and a second end connected to a spring load (109, 113) so as to allow the first end of the spaced apart beams to follow the thickness of the first and the second belly sides.

Embodiment 4

The trimming system according to embodiment 3, wherein the force supplying means (110, 111) further comprises plurality of elongaged beams (102) extending at least between the first (107) and the second (108) positions along the first and the second sides of the supporting structure, where each elongaged beam is mounted to a first end and a second end pairs selected from the plurality of spaced apart beams such that the plurality of elongaged beams interact with the fish.

Embodiment 5

The trimming system according to any of the preceding embodiments, wherein the supporting structure (101) comprises a flat plate structure.

Embodiment 6

The trimming system according to any of the preceding embodiments, wherein the profile measuring means (104) comprises a first pivotal member (221) arranged at the first side of the supporting structure and a second pivotal member arranged at the second side of the supporting structure, where each of the first and the second pivotal members are pivotally mounted to a structure (222) rotatable around a rotation axis with the free end of each of the first and the second pivotal members adapted to interact with the exposed ends of the belly sides of the fish, and where the angular position of the profile measurement of the first and the second pivotal members is utilized to determine the profile of the first and the second belly sides.

Embodiment 7

The trimming system according to any of the preceding embodiments, wherein the cutting means comprises a circular cutting blade (112).

Embodiment 8

A method for trimming de-capitated and gutted fish (230), the method comprising:
engaging the fish with a supporting structure (101) such that a first belly side (202) of the fish extends along a first side of the supporting structure and a second belly side (203) of the fish extends along a second side of the supporting structure,
supplying opposite forces onto the first and the second belly sides towards the first and the second sides of the supporting structure with a force supplying means (102) for,
advancing the fish from a first position (107) to a second position (108) with an advancing means (210, 211) for,
measuring, at the first and the second sides of the supporting structure, the profile of the first and the second belly sides with a profile measuring means (104) arranged at the first position,
utilizing profile data from the profile measuring means for operating a cutting means arranged at the second position in trimming the belly sides of the fish,
wherein the opposite forces supplied by the supporting structure are supplied at the first position while measuring the lower edges of the first and the second belly sides and at the second position while trimming the fish.

The invention claimed is:

1. A trimming system for trimming fish, the system comprising:
a supporting structure adapted to engage with the fish such that a first belly side of the fish extends along a first side of the supporting structure and a second belly side of the fish extends along a second side of the supporting structure,
a force supplying means for supplying opposite forces onto the first and the second belly sides towards the first and the second sides of the supporting structure,
an advancing means for advancing the fish from a first position to a second position,
a profile measuring means arranged at the first position for measuring, at the first and the second sides of the supporting structure, the profile of the first and the second belly sides of the fish, a cutting means arranged at the second position, the cutting means being operable to trim the first and second belly sides of the fish, a control unit operably connected to the profile measuring means for receiving profile data acquired by the profile measuring means and for controlling operation of the cutting means to trim the first and second belly sides of the fish, wherein the profile measuring means and the force supplying means are positioned and configured such that the opposite forces are supplied by the force supplying means at the first position while a lower edge of at least one of the first and the second belly sides is being measured by the profile measuring means.

2. The trimming system according to claim 1, wherein the cutting means and the force supplying means are positioned and configured such that the opposite forces are supplied by the force supplying means while at least one of the first and second belly sides of the fish is being trimmed by the cutting means.

3. The trimming system according to claim 2, wherein the opposite forces are supplied by the force supplying means at the second position.

4. The trimming system according to claim 1, wherein the force supplying means extends between the first and the second positions and is further adapted to continuously supply the opposite forces between the first and the second positions.

5. The trimming system according to claim 1, wherein the force supplying means comprises a spring load system arranged at the first position and at the second position, where the spring load system comprises plurality of spaced apart beams arranged down the side of the supporting structure, where each of the spaced apart beams includes a first end facing the supporting structure and a second end connected to a spring load so as to allow the first end of the spaced apart beams to follow the thickness of the first and the second belly sides.

6. The trimming system according to claim 5, wherein the force supplying means further comprises a plurality of elongated beams extending at least between the first and the second positions along the first and the second sides of the supporting structure, where each elongated beam is mounted to a first end of at least one of the spaced apart beams such that the plurality of elongated beams interact with the fish.

7. The trimming system according to claim 6, wherein at least one of the of elongated beams comprises a force providing structure configured to provide force against the supporting structure, the force providing structure being arranged at the second position.

8. The trimming system according to claim 7, where the force providing structure forms a flexible end portion at least at one of the first and the second positions, the flexible end portion being elastically deformable in a horizontal plane.

9. The trimming system according to claim 1, wherein the supporting structure comprises two plate structures placed with a distance to each other to form a space between the plates.

10. The trimming system according to claim 1, wherein the profile measuring means comprises a first pivotal member arranged at the first side of the supporting structure and a second pivotal member arranged at the second side of the supporting structure, where each of the first and the second pivotal members are pivotally mounted to a structure rotatable around a rotation axis with the free end of each of the first and the second pivotal members adapted to interact with the exposed ends of the belly sides of the fish, and where the angular position of the first and the second pivotal members is utilized to determine the profile of the first and the second belly sides.

11. The trimming system according to claim 1, wherein the cutting means comprises a circular cutting blade.

12. The trimming system according to claim 11, wherein the force supplying means and the circular cutting blade are both closer than the diameter of the circular cutting blade from a plane which is transverse to a conveying direction from the first to the second position.

13. The trimming system according to claim 12, where the force supplying means overlap the circular cutting blade in the conveying direction whereby the force supplying means and the cutting blade both cross the plane which is transverse to the conveying direction.

14. The trimming system according to claim 11, comprising a sole having a slot in which the circular cutting blade is received.

15. The trimming system according to claim 14, wherein the force supplying means and the sole are both closer than the diameter of the circular cutting blade from a plane which is transverse to a conveying direction from the first to the second position.

16. The trimming system according to claim 11, where the circular blade and the sole are connected to an actuator and configured to move jointly in response to the measured profile of the first or the second belly sides.

17. The trimming system according to claim 1, comprising filleting means arranged to cut fillets from the belly sides of the fish, the cutting means being arranged between the filleting means and the profile measuring means.

18. The trimming system according to claim 17, comprising back cutting means for cutting into the back of the fish, the back cutting means being arranged between the cutting means and the filleting means.

19. The trimming system according to claim 1, comprising tail cutting means arranged for cutting from anal vent to tail of the fish.

20. A method for trimming fish, the method comprising:
engaging the fish with a supporting structure such that a first belly side of the fish extends along a first side of the supporting structure and a second belly side of the fish extends along a second side of the supporting structure, supplying opposite forces onto the first and the second belly sides towards the first and the second sides of the supporting structure with a force supplying means, advancing the fish from a first position to a second position with an advancing means, measuring, at the first and the second sides of the supporting structure, the profile of at least one of the first and the second belly sides with a profile measuring means arranged at the first position, utilizing profile data from the profile measuring means for operating a cutting means arranged at the second position for trimming the belly sides of the fish, wherein the opposite forces are supplied at the first position while measuring the lower edges of at least one of the first and the second belly sides and while trimming the fish at the second position.

21. A method according to claim 20, comprising an initial step of decapitating and gutting the fish.

* * * * *